United States Patent
Trick et al.

(10) Patent No.: US 6,315,226 B1
(45) Date of Patent: Nov. 13, 2001

(54) ADJUSTABLE CUTTING MECHANISM

(75) Inventors: Kevin Matthew Trick, Addison; George Anthony Vindiola, Dallas, both of TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/514,982

(22) Filed: Feb. 29, 2000

(51) Int. Cl.[7] .................................................. B02C 18/18
(52) U.S. Cl. ........................ 241/294; 29/700; 425/311; 425/313
(58) Field of Search ..................... 83/699.51; 264/142, 264/148; 425/289, 311, 313, 379.1; 241/294; 29/700

(56) References Cited

U.S. PATENT DOCUMENTS 3,981,959 * 9/1976 Cuff ........................................ 264/142
4,123,207 * 10/1978 Dudley ................................ 425/379.1

* cited by examiner

*Primary Examiner*—Mark Rosenbaum
(74) *Attorney, Agent, or Firm*—Carstens, Yee & Cahoon; Colin P. Cahoon

(57) ABSTRACT

An adjustable cutting mechanism for mounting on an extruder. The cutting mechanism incorporates a square stock blade holder that is axially adjustable and holds a shortened cutting blade. The axial adjustment allows for uniform contact of the cutting mechanism blades with an associated extruder die surface. A shorter blade, along with the adjustability of the mechanism for contact with the die face, prevents deflection of the cutting blade and, thereby, insures the precise cutting action needed for the product to maintain shape integrity.

17 Claims, 5 Drawing Sheets

ADJUSTABLE CUTTING MECHANISM

BACKGROUND OF THE INVENTION

1. Technical Field

The present invention relates to an axially adjustable cutting mechanism and, in particular, to an extrudate cutting mechanism that incorporates blade holders that can be adjusted for uniform contact with an extruder die face.

2. Description of Related Art

Extruders used in the food processing industry commonly employ cutting devices that cut extrudate to a desired size as it exits the die face of the extruder. An example of prior art cutting mechanisms used with an extruder is shown in FIGS. 1, 2, and 3.

FIG. 1 shows a side view of a tube turn 110, bell 112, and die 114 assembly of an extruder. In operation, product, such as masa, is forced through the tube turn 110 into the bell 112. It is then extruded through the die 114. A shaft 116 extends through the turn 110, bell 112, and die 114. Mounted on the end of the shaft 116 is a cutting mechanism. The cutting mechanism comprises a hub 130, spokes 132 extending from the hub 130, and blade holders 134 attached to the spokes. Each blade holders 134 in turn maintains a blade 136 in contact with the die 114.

FIG. 2 shows a bottom view of the die face 115. Corresponding reference numerals are used to represent corresponding elements on all figures unless otherwise indicated. The die face 115 will typically exhibit a number of channels or ports 120 that are cut through the die 114, thus allowing communication of the product from the bell, through the die 114, onto the die face 115. As the product emerges from these ports, it is cut into relatively uniform pieces by the blades 136 as the entire cutting mechanism rotates about the shaft in the direction 102 illustrated in FIG. 2. Such rotation 102 is typically in speeds ranging from sixty to one hundred fifty rpm, with approximately one hundred forty rpm generally used for cutting masa extrudate.

FIG. 3 shows a perspective view of a prior art cutting mechanism detached from the extruder. The side of the cutting mechanism presented is the same side that interfaces with the die face. Again shown is the hub 130, the spokes 132, the blade holders 134, the blades 136, and the direction 102 of intended rotation. The blade holders 134 on a prior art cutting mechanism are rigidly mounted to the spokes 132, and thus static in relation to the cutting mechanism. Consequently, referring back to FIG. 1, the distance between the die face 115 and the blades 136 cannot be easily adjusted for each individual blade 136. The overall distance of the cutting mechanism from the die face 115 is adjusted by using washers placed between the hub 130 and the die face 115. The casting tolerance of the entire mechanism is relied upon to insure a consistent contact between each individual blade 136 and the die face 115. However, if a spoke 132 or blade holder 134 becomes slightly bent or is otherwise out of tolerance, the blades 136 will not make consistent contact with the die face 115. This can result in uneven cutting or smearing of the extrudate and misshapen product.

Exact tolerance between the blades 136 and the die face 115 is particularly important when the extrudate shape is complex, such as the race car shaped extrudate that would be generated by the die 114 shown in FIG. 2. This race car pattern of the die ports 120 requires that the blades 136 remain consistently flush against the die face 115 and not deflect away from the die face 115 during cutting. Attempts to maintain consistent tolerance between the blades 136 and die face 115 in the past using prior art cutting mechanisms include physically bending the blade holders 134 or spokes 132. This was not found to be an acceptable solution for the application shown in FIG. 2, however. Regardless of the minor adjustments made to the cutting mechanism, a consistent and clean cut, with no smearing of the extrudate pieces or misshapen product, could not be consistently achieved with the prior art cutting mechanism.

Consequently, a need exists for a cutting mechanism that is adjustable such that the fit between the cutting blades and the die face can be maintained consistently and adjusted as required. Such adjustable cutting mechanism should be adaptable to existing extruders and provide for clean cuts through extrudate even when the extrudate involves complex shapes.

SUMMARY OF THE INVENTION

The proposed invention comprises an adjustable cutting mechanism for use with an extruder and allows for individual adjustment of the interface between each cutting blade and the die face. An alternative embodiment also allows for adjustments of the angle of incidence between each blade and the die face.

The distance between each blade and the die face is adjustable axially by sliding a square stock blade holder through a channel in the end of each associated hub spoke. After the cutting mechanism is mounted on a drive shaft, each individual blade can be placed in direct contact with the die face. This position is then secured by tightening a set screw in the end of each spoke which applies pressure to a portion of the blade holder within the spoke channel. In one embodiment, the cutting blades themselves are shortened in order to reduce deflection of the cutting blades from the die face.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
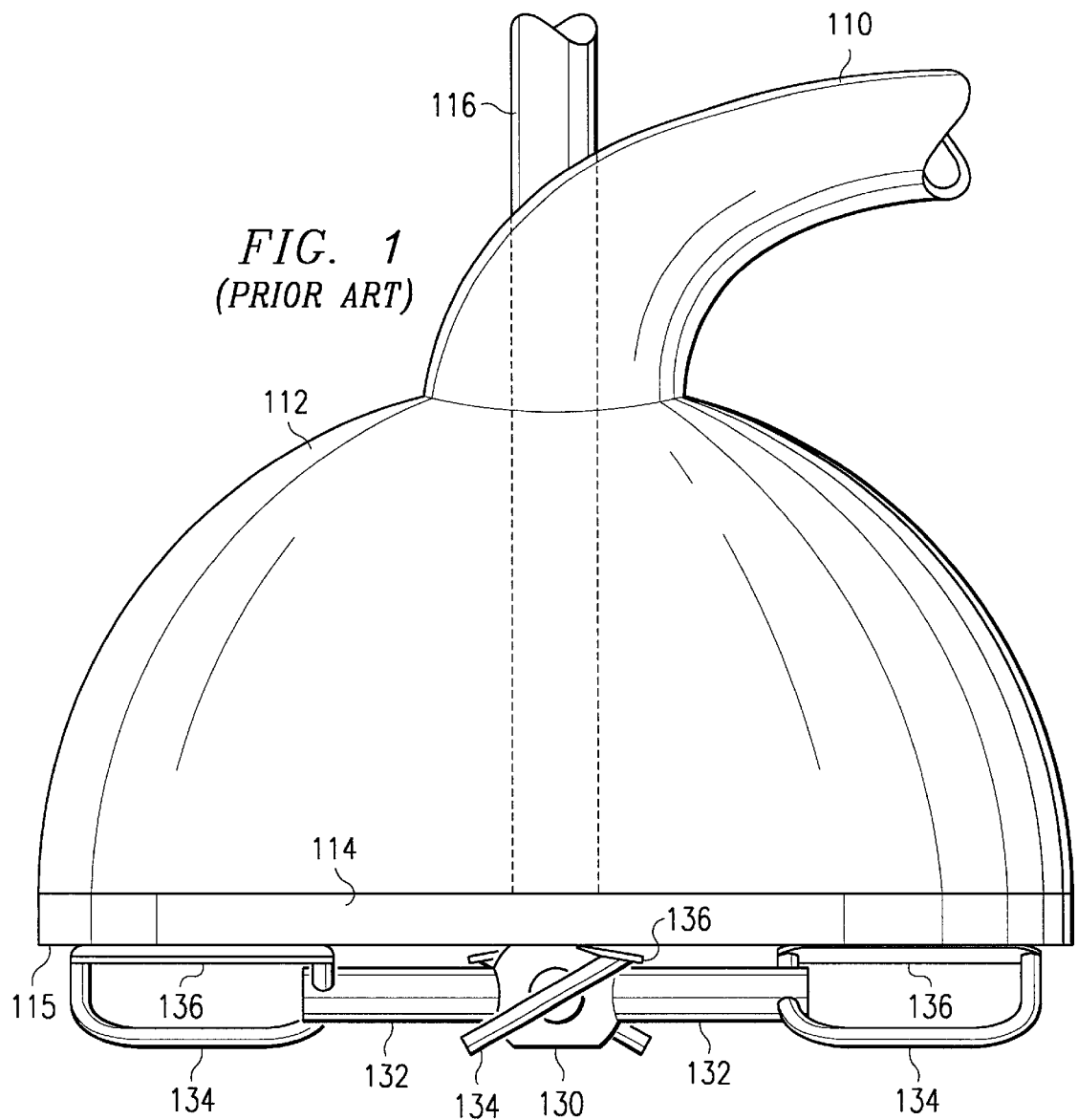
FIG. 1 is a side view of an extruder with a prior art cutting mechanism attached.
Figure 2:
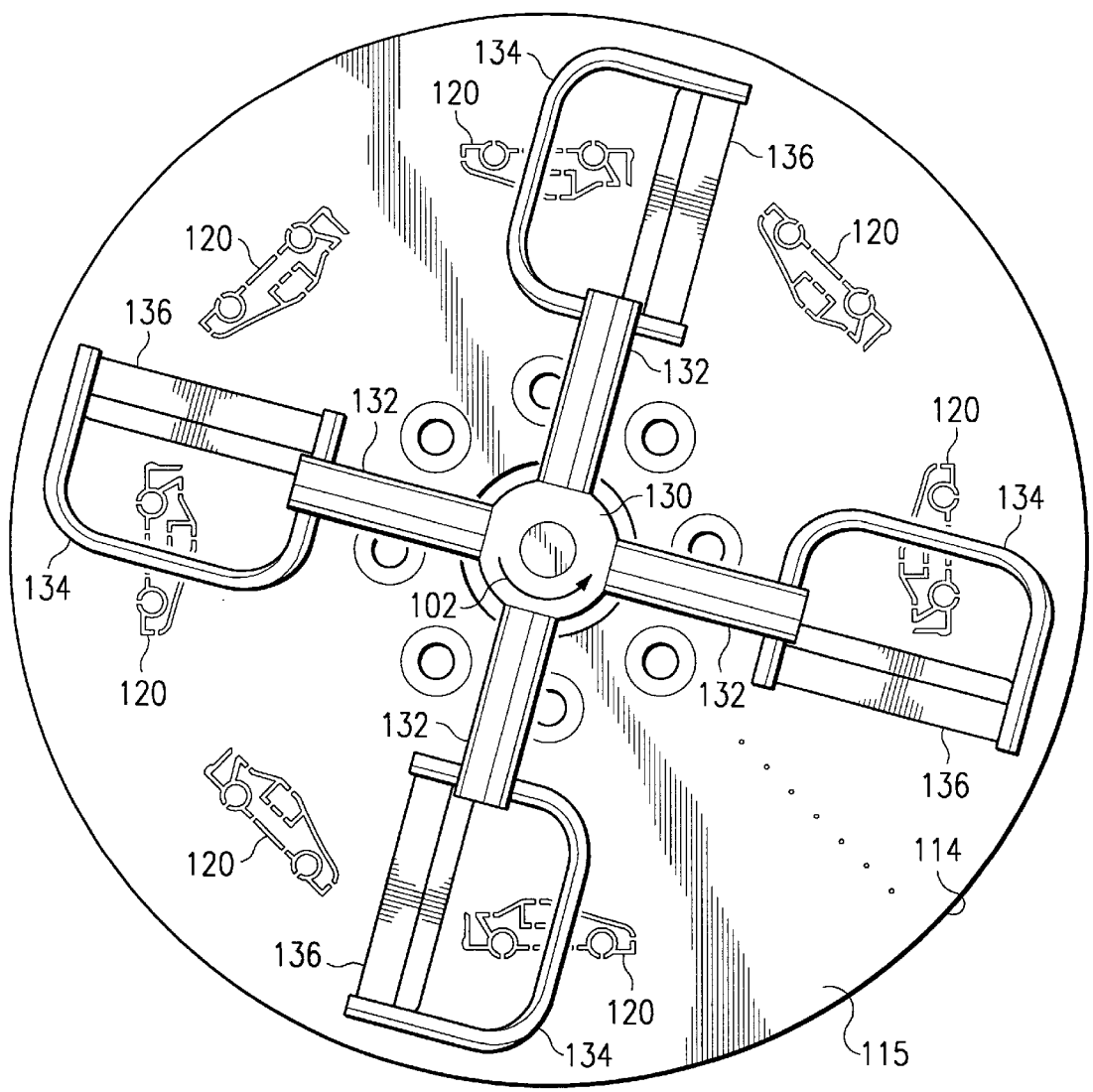
FIG. 2 is a bottom plan view in elevation of a die face and a prior art cutting mechanism.
Figure 3:
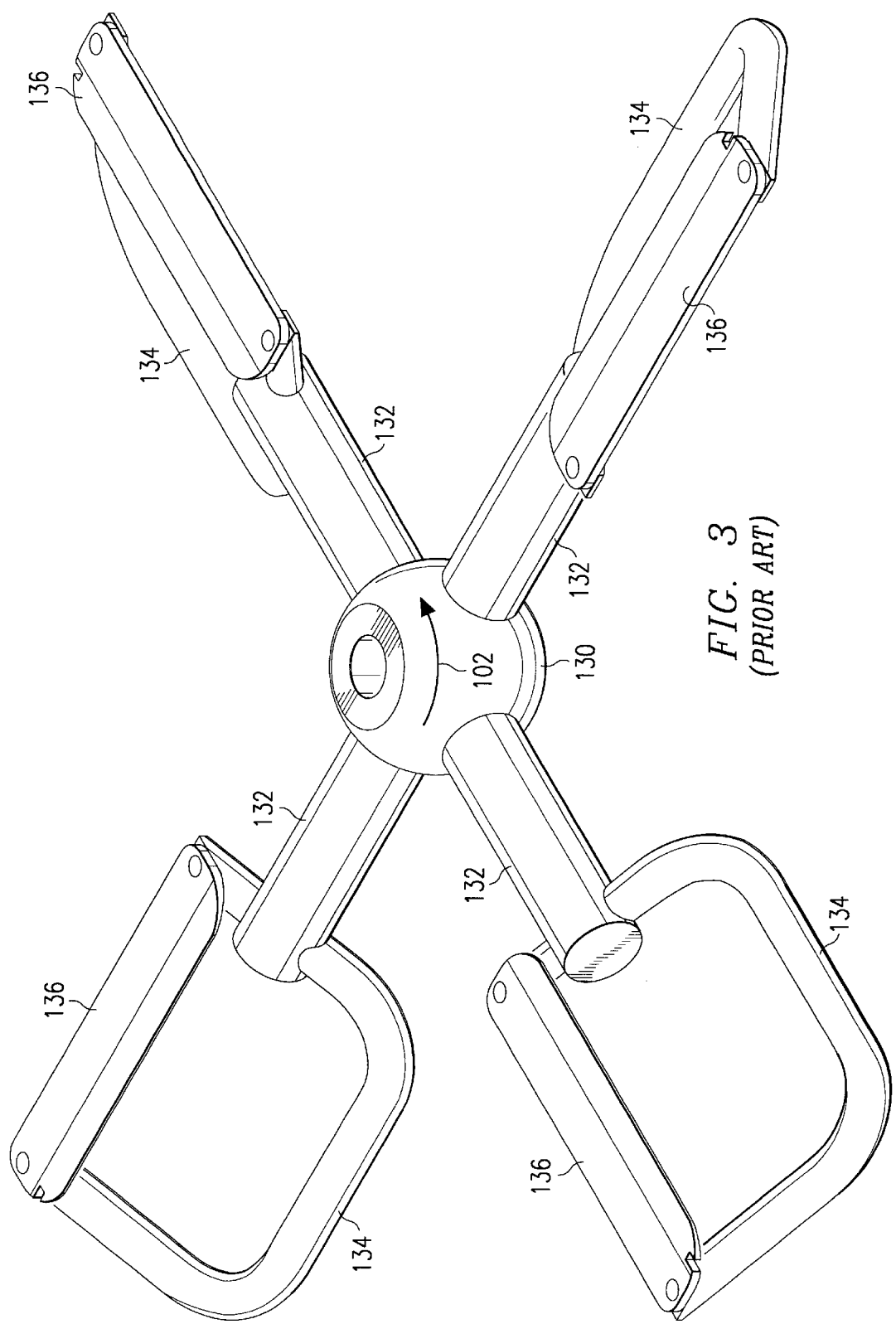
FIG. 3 is a perspective view in elevation of a prior art cutting mechanism.
Figure 4:
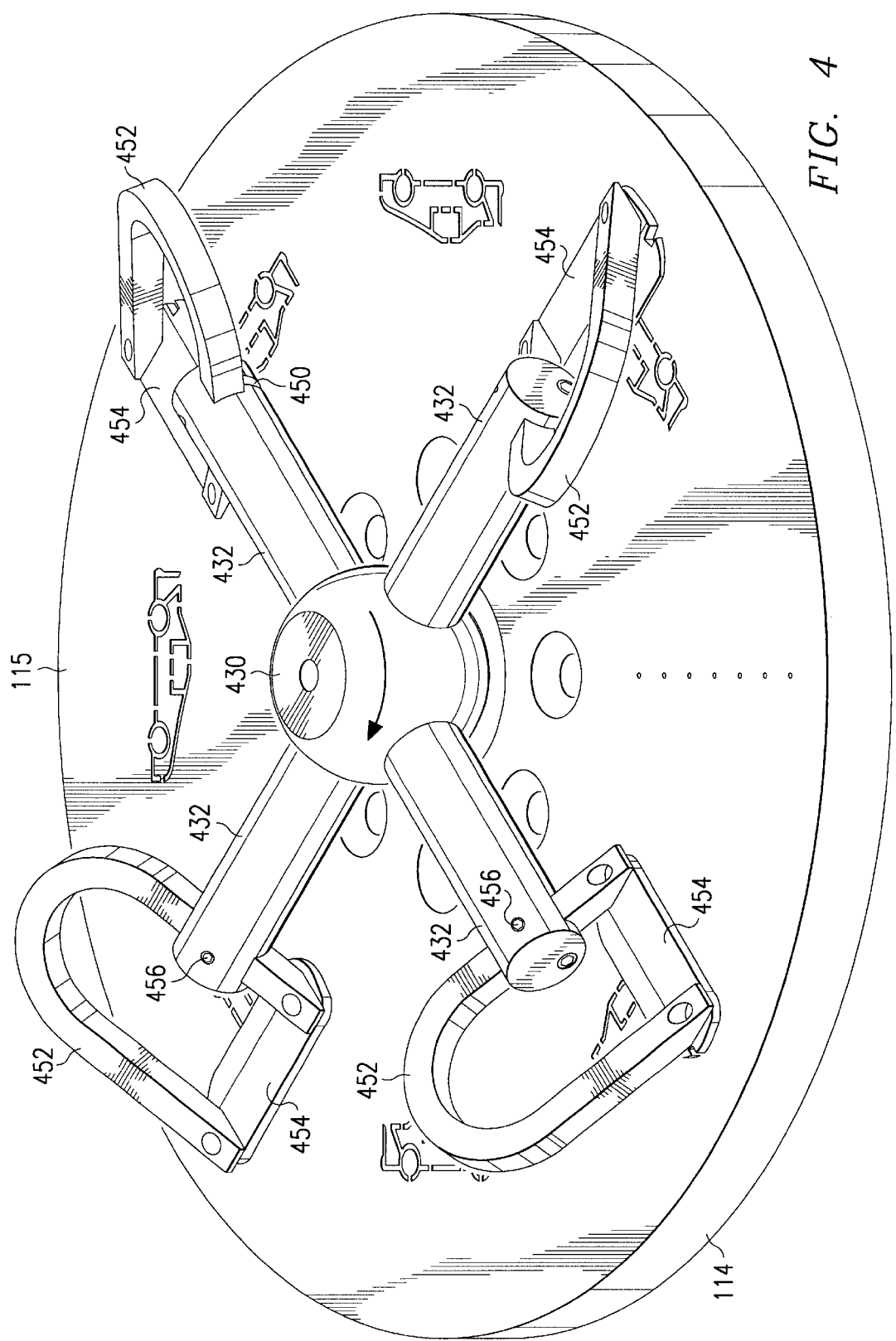
FIG. 4 is a perspective view in elevation of one embodiment of the invention mounted on an extruder die.
Figure 5:
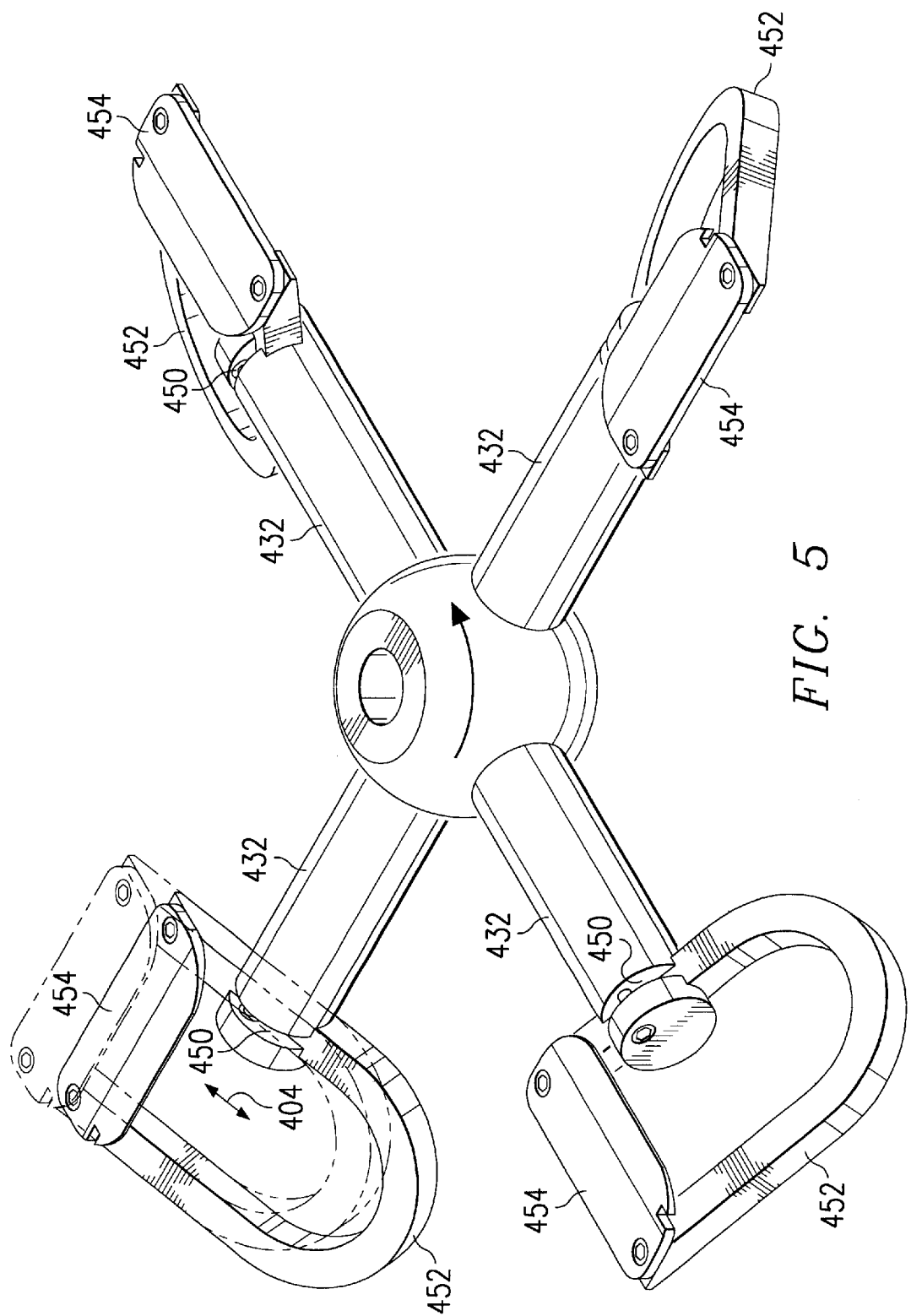
FIG. 5 is a perspective view in elevation of one embodiment of the invention.

FIGS. 4 and 5 show perspective views of one embodiment of the present invention. Again, corresponding reference numerals are used for corresponding elements unless otherwise indicated.

FIG. 4 shows one embodiment of the present invention mounted on an extruder die 114. The hub 430 of the cutting mechanism of Applicants' invention can be identical to the hub of the prior art cutting mechanism. However, the spokes 432 of the present invention further comprise a channel 450 into which a blade holder 452 can be slid prior to the attachment of the blades 454. This allows for movement 404 of the blade holder within the channel 450 (as is illustrated in FIG. 5). It is this movement 404 that allows for the axial adjustment of the blades 454 relative to the die face 115. The blade holder 452 is secured in the channel 450 by a set screw 456 tapped through the spoke 432, as illustrated in FIG. 4.

Applicants' invention eliminates the need for the placement of washers or spacers under the hub 430, because each individual blade 454 can be positioned with precise tolerance relative to the die face 115. The set screws 456 are loosened prior to installing Applicants' invention on the extruder. Once the hub 430 has been attached to the drive shaft, the blade holders 452 are then slid towards the die face 115 until the individual blades 454 come into proper contact flush with the die face 115. Each set screw 456 is then tightened to secure this relative position.

FIGS. 4 and 5 show an embodiment of Applicants' invention that incorporates square stock for the blade holders 452. This square stock is preferable to the round stock used for prior art blade holders in that it prohibits rotation of the blade holders 452 about the axis of their respective spokes 432. Such rotation would allow deflection of the blades 454 away from the die face 115. While square stock is illustrated in the embodiment shown in FIGS. 4 and 5, it is understood that other shapes might be used for the blade holders 452, such as hexagonal stock, triangular stock, or semi-circular stock, as long as the shape of the blade holder 452 provides a flat surface contact with the channel 450 sufficient to eliminate the rotation of the blade holder 452 within the channel 450. Further, although the embodiment shown in FIGS. 4 and 5 use one set screw 456 to secure the blade holder, any other method of securing the blade holder 452 to the spoke 432 is acceptable, such as a clamping means or the use of two or more set screws.

Another feature illustrated in FIGS. 4 and 5 of a preferred embodiment of Applicants' invention is the shortening of the width of the blades 454. Blades used on prior art cutting mechanisms are typically approximately four inches long. This promotes deflection in the center of the blade when the longer blade comes into contact with extrudate. Further, this longer blade provides a longer lever arm between the far end of the blade and the rotating hub, thus promoting deflection of the entire blade holder away from the die face. To address these issues, one embodiment of the present invention uses a shorter blade 454 of approximately two and one eighth inches in width. This shorter blade 454 is of adequate size to cut the extrudate, yet minimizes both deflection along the center of the blade 454 and axially deflection of the blade 454 and blade holder 452 away from the die face 115.

FIG. 5 illustrates one mechanism for adjusting the axially position of the blades 454 and blade holders 452. With the set screw disengaged, the blade holder 452 can slide 404 freely in the spoke channel 450. Once the proper axial adjustment has been made, the set screw is then tightened to secure the blade holder 452 and respective blade 454 in a relative position to the die face.

In another embodiment of the invention, a means is provided for the adjustment of the angle of incidence between the blade 454 and the die face. This can be accomplished, for example, by a pivotable sleeve (not illustrated) installed about the end of each spoke, proximate to the channel 450. This sleeve would allow for the rotation of the blade holder 452 about the axis of each spoke 432. Such rotation would allow for setting an ideal angle of incidence between the individual blades 454 and the die face for each application of the cutting mechanism. For example, it has been found that the ideal angle of incidence between the cutting blades 454 and die face 115 for the application shown in FIG. 4 using masa is approximately 5°. Consequently, the embodiment illustrated in FIGS. 4 and 5 can be manufactured to provide for this angle of incidence. However, for the embodiment that utilizes an adjusting means for adjusting the angle of incidence (not illustrated), the angle of incidence between the blades and the die face could be adjusted upon experimentation in order to obtain the ideal angle of incidence for each individual application.

While the invention has been particularly shown and described with reference to a preferred embodiment, it will be understood by those skilled in the art that various changes in form and detail may be made therein without departing from the spirit and scope of the invention.

What is claimed is:

1. An adjustable cutting mechanism for cutting extrudate from any extrusion die, said cutting mechanism comprising:
    a hub;
    at least one spoke attached to said hub;
    a blade holder attached to said at least one spoke; and
    wherein said blade holder is axially adjustable relative to said hub.

2. The adjustable cutting mechanism of claim 1 wherein the blade holder is secured relative to the spoke by a set screw tapped into said spoke.

3. The adjustable cutting mechanism of claim 1 wherein the blade holder comprises square stock.

4. The adjustable cutting mechanism of claim 1 wherein the blade holder is angularly adjustable and pivots about the axis of said at least one spoke.

5. The adjustable cutting mechanism of claim 1 further comprising:
    a blade attached to said blade holder.

6. The adjustable cutting mechanism of claim 5 wherein the cutting width of said blade is less than 2.5 inches.

7. The adjustable cutting mechanism of claim 5 wherein the angle of incidence between the blade and die face is adjustable.

8. The adjustable cutting mechanism of claim 5 wherein the angle of incidence between the blade and die face is fixed between 2° and 10°.

9. A cutting apparatus mountable on an extruder, said extruder having a die face and a drive shaft centered through and perpendicular to the die face, said cutting apparatus comprising:
    a hub for mounting the apparatus on the drive shaft:
    a plurality of spokes attached to and extending from said hub, each having a channel for receiving a blade holder;
    a u-shaped blade holder inserted one each in the channel of each of said spokes; and
    a blade attached to each blade holder, wherein the distance between the blades and die face is adjustable by moving the blade holders within the spoke channels.

10. The cutting apparatus of claim 9 wherein each spoke further comprises a set screw for securing a blade holder in said channel.

11. The cutting apparatus of claim 9 wherein said u-shaped blade holders comprise square stock.

12. The cutting apparatus of claim 9 wherein each spoke further comprises a pivotable sleeve for adjusting the angle of incidence between the blades and a die face.

13. The cutting apparatus of claim 9 wherein said blade comprises a contact surface with a die face of less than 2.5 inches in width.

14. The cutting apparatus of claim 9 wherein the angle incidence between the blades and die face is fixed between 2° and 10°.

15. A method for mounting a cutting apparatus on an extruder, comprising:

providing an extruder having an extruder die face and a drive shaft centered through and perpendicular to the die face;

mounting a hub to the cutting apparatus on the drive shaft;

extending a plurality of spokes from the hub, each having a channel for receiving a blade holder;

inserting a u-shaped blade holder into each channel of the spokes;

attaching a blade to each blade holder; and adjusting the distance between each blade and die face by moving the blade holders within the spoke channels.

16. The method of claim 15 further comprising the step of:

securing the blade holder in the channel with a set screw.

17. The method of claim 15 further comprising the step of:

adjusting the angle of incidence between the blades and the die face with a pivotable sleeve disposed within each spoke.

* * * * *